(12) United States Patent
Huang et al.

(10) Patent No.: US 9,606,532 B2
(45) Date of Patent: Mar. 28, 2017

(54) METHOD AND MANUFACTURING SYSTEM

(71) Applicant: Taiwan Semiconductor Manufacturing Company Limited, Hsinchu (TW)

(72) Inventors: Wei-Pin Huang, Miaoli County (TW); Wen-Chi Chien, Miaoli County (TW); Yuh-Dean Tsai, Hsinchu (TW); Bing-Yuan Cheng, Hsinchu County (TW); Wei-Cheng Wang, Taoyuan County (TW)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 533 days.

(21) Appl. No.: 14/166,892

(22) Filed: Jan. 29, 2014

(65) Prior Publication Data
US 2015/0212517 A1    Jul. 30, 2015

(51) Int. Cl.
*G05B 19/418* (2006.01)
(52) U.S. Cl.
CPC ... *G05B 19/4189* (2013.01); *G05B 19/41865* (2013.01); *G05B 2219/31376* (2013.01); *G05B 2219/31388* (2013.01); *G05B 2219/45031* (2013.01); *Y02P 90/20* (2015.11); *Y02P 90/28* (2015.11)

(58) Field of Classification Search
None
See application file for complete search history.

(56) References Cited

U.S. PATENT DOCUMENTS

| | | | | |
|---|---|---|---|---|
| 5,858,863 A * | 1/1999 | Yokoyama | ............ | C23C 14/568 438/514 |
| 6,134,482 A * | 10/2000 | Iwasaki | ............ | G05B 19/41865 414/14 |
| 6,351,686 B1* | 2/2002 | Iwasaki | ................. | F02M 5/125 700/121 |
| 6,516,238 B1* | 2/2003 | Kim | ................. | G05B 19/41895 700/112 |

(Continued)

OTHER PUBLICATIONS

Taiwan Office Action; Application No. 103146025; dated Jan. 6, 2017.

*Primary Examiner* — Isaac T Tecklu
(74) *Attorney, Agent, or Firm* — Jones Day

(57) ABSTRACT

A method for transporting a group of semiconductor wafers and a manufacturing system are provided. A semiconductor processing facility is provided. The semiconductor processing facility includes a first destination, a second destination, and a transport system configured to transport a group of semiconductor wafers from the first destination to the second destination. Real time information is collected, where the real time information includes information on a current process executing in the semiconductor processing facility and information on a transfer time. The information on the transfer time includes data that indicates an amount of time required to transport the group of semiconductor wafers from the first destination to the second destination. A request is issued to the transport system to effect the transportation of the group of semiconductor wafers from the first destination to the second destination. A timing of the request is based on the first and second data.

21 Claims, 5 Drawing Sheets

(56) References Cited

U.S. PATENT DOCUMENTS

| | | | |
|---|---|---|---|
| 6,616,394 B1* | 9/2003 | Park | H01L 21/67178 |
| | | | 414/217 |
| 6,622,057 B1* | 9/2003 | Ko | G05B 19/41815 |
| | | | 700/112 |
| 7,153,087 B2 | 12/2006 | Kang et al. | |
| 2003/0098125 A1* | 5/2003 | An | C23C 16/0236 |
| | | | 156/345.31 |
| 2004/0107020 A1* | 6/2004 | Yokoyama | C23C 14/568 |
| | | | 700/121 |
| 2005/0015174 A1* | 1/2005 | Arai | G05B 19/41865 |
| | | | 700/121 |
| 2005/0075753 A1* | 4/2005 | Chang | G06Q 10/047 |
| | | | 700/214 |
| 2005/0149217 A1* | 7/2005 | Okada | G06Q 10/06 |
| | | | 700/96 |
| 2006/0111805 A1* | 5/2006 | Yokoyama | C23C 14/568 |
| | | | 700/112 |
| 2006/0223334 A1 | 10/2006 | Saki | |
| 2009/0053017 A1* | 2/2009 | Shmuelov | H01L 21/67017 |
| | | | 414/217 |
| 2009/0067957 A1* | 3/2009 | Ando | B65G 37/02 |
| | | | 414/222.05 |
| 2010/0057239 A1* | 3/2010 | Masuda | G05B 19/41865 |
| | | | 700/105 |
| 2010/0212585 A1* | 8/2010 | Tsukinoki | H01L 21/67781 |
| | | | 118/500 |
| 2012/0132412 A1* | 5/2012 | Yamamoto | H01L 21/67109 |
| | | | 165/287 |
| 2014/0067110 A1* | 3/2014 | Lawson | H01L 21/67276 |
| | | | 700/117 |

* cited by examiner

METHOD AND MANUFACTURING SYSTEM

BACKGROUND

In semiconductor manufacturing, semiconductor wafers must be safely transported between processing stations without damaging or destroying the wafers. The manufacturing of other articles (e.g., pharmaceuticals, medical systems, flat panel displays, computer hardware) may similarly require the careful handling and transport of materials. Semiconductor wafers may be retained in a clean room environment during processing to preserve the purity of the layers deposited on the wafers. For additional protection against contaminants, the semiconductor wafers may be retained in sealed transport containers as they are moved throughout the manufacturing facility in order to minimize any exposure to the environment outside of the processing stations. At various points during a fabrication process, semiconductor wafers may be transported in a container via an automated conveyor system, and the container may be temporarily removed from the conveyor system at various intervals to process the semiconductor wafers.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
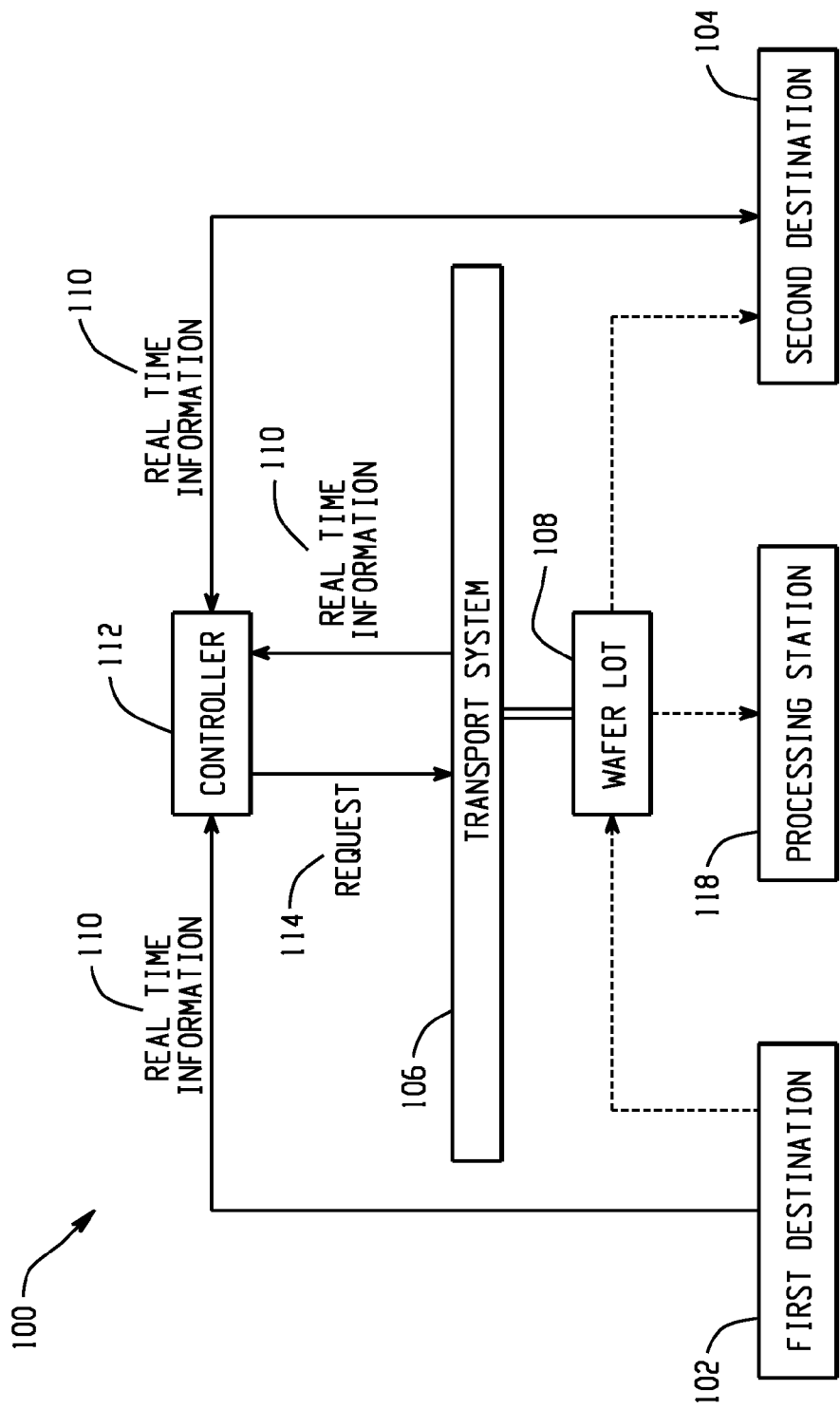
FIG. 1 depicts an example manufacturing system for a semiconductor processing facility.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts an example manufacturing system for a semiconductor processing facility 100. In the example of FIG. 1, the semiconductor processing facility 100 may include a first destination 102 and a second destination 104. The first destination 102 may include a stocker or another piece of processing equipment. The stocker may function as a storage location for various materials used in the semiconductor processing facility 100. For example, the first destination 102 may include the stocker for storing containers or cassettes, and the containers or cassettes may include semiconductor wafers or flat panels that are used in a manufacturing process (e.g., wafer lots or boxes of wafers). The second destination 104 may include a semiconductor processing chamber or other semiconductor processing equipment. For example, the second destination 104 may include a vacuum chamber for processing semiconductor wafers (e.g., performing an epitaxial growth process, performing a deposition process, etching features on the semiconductor wafers, etc.).

The semiconductor processing facility 100 may include "chamber type process tools." In the facility 100, each lot of wafers may be used in producing a particular product or device. In order to prepare the particular product or device, each lot of wafers may be processed in a particular chamber. Thus, a "chamber type process tool" may be a chamber configured to process wafer lots for a particular product or device. For example, a wafer lot A may be used in producing a first product or device, and a first chamber of the facility 100 may be used to process the wafer lot A. Similarly, a wafer lot B may be used in producing a different, second product or device, and a different, second chamber of the facility 100 may used to process the wafer lot B. In an example, a wafer lot may specify the chamber (e.g., process unit) that should be used for processing the wafer lot. The semiconductor processing facility 100 may include various other process tools that may be used in producing multiple different products or devices (e.g., an additional process tool included in the facility 100 may be used to process both the wafer lot A and the wafer lot B in the example above). Thus, each piece of processing equipment in the facility 100 may specify whether it is configured to be used for producing a single product or device, or whether the piece of processing equipment is configured to be used in producing multiple, different products or devices. In an example, the system may include a chamber type tool that designates (e.g., generates a reply specifying) a processing lot and corresponding chamber that should be processed subsequently. The designated processing lot and chamber may be based on a number of works-in-progress (WIP) that are queued before the various processing tools of the system.

The semiconductor processing facility 100 may further include a transport system 106. The transport system 106 may be configured to transport a wafer lot 108 (e.g., a box of semiconductor wafers or any group of semiconductor wafers) from the first destination 102 to the second destination 104 and to various other locations within the facility 100. The transport system 106 may comprise an automated material handling system (AMHS) that moves containers or cassettes of semiconductor materials to various destinations of the semiconductor processing facility 100. Specifically, the transport system 106 may comprise an automated overhead transport (OHT) system. The transport system 106 may thus use ceiling tracks and OHT transport vehicles that move along the ceiling tracks to deliver materials to the various destinations.

The transport system 106 may enable the wafer lot 108 to be delivered to the second destination 104 and to various other locations in the semiconductor processing facility 100 (e.g., intermediate destinations between the first destination 102 and the second destination 104). For example, the transport system 106 may enable delivery of the wafer lot 108 to a processing station 118 of the semiconductor processing facility 100. Various processing of the wafer lot 108 may occur at the processing station 118, where the processing may prepare the wafer lot 108 to be used at the second destination 104. For example, the processing station 118 may comprise a buffer station, where the wafer lot 108 may be cleaned, planarized, etched, or otherwise prepared for further processing at the second destination 104.

Aspects of a current process (e.g., a semiconductor processing sequence) may be performed at the first destination 102, the second destination 104, or at the processing station 118. The current process may include various types of semiconductor processing. In one example, the current process may be a semiconductor ETCH stage, including four steps (100->200->300->400), where a wafer or a wafer lot is processed according to the four steps. In the example of FIG. 1, step 100 may be performed at the first destination 102, step 200 may be performed at the processing station 118, step 300 may be performed at a second processing station (not depicted in FIG. 1), and step 400 may be performed at the second destination 104. In an example, the step 400 may be performed at a "chamber type tool." The chamber type tool, as described above, may be used to process wafer lots in order to produce a particular product or device (e.g., wafer lots that are not processed to form the particular product or device may not be processed in the chamber type tool).

In alternative systems, an incorrect lot (e.g., a worst lot) that cannot be processed in the chamber type tool may be placed on the transport system 106, which may thus cause a period of "chamber lost" time (e.g., a period of time in which the chamber type tool is functional, but is in an idle state). As explained in further detail below, the present disclosure may provide a system whereby real time data collected in the facility 100 may be used to provide a correct lot to the transport system 106 (e.g., a lot that can be processed by the chamber type tool), such that an idle time of the chamber type tool or other process equipment may be minimized. Thus, as explained below, real time data from downstream processing equipment may be provided to upstream processing equipment, thus allowing the upstream processing equipment to prepare a correct wafer lot for the downstream processing equipment. In an example, in a facility in which there are multiple processes occurring simultaneously, the real time data provided to the upstream equipment may be used to monitor a state of progress of each of the multiple processes such that wafer lots may be placed on the process line in a manner that minimizes idle equipment time (e.g., as between two processes A and B that involve two different chamber type tools, the real time data may indicate to upstream processing equipment that a wafer lot A for the process A should be placed on the processing line before a wafer lot B for the process B, in order to minimize idle equipment time).

The current process performed at the first destination 102, the second destination 104, and the processing station 118 may include a plurality of steps and may include a critical stage. The critical stage may be a particular step of the plurality of steps, where the particular step limits a throughput of the current process more than all other steps of the plurality of steps. Thus, the critical stage may be a bottleneck step of the current process. In examples where multiple processes occur on the processing line including multiple chamber type process tools, different wafer lots that are processed by different equipment may have different critical stages. A critical stage may be associated with a particular piece of equipment that most limits a throughput of a process.

In the example of FIG. 1, it may be desirable to ensure that the wafer lot 108 is available at the second destination 104 in advance of a completion of the current process. This may be desirable in order to avoid lost processing time. For example, when the current process is completed, the wafer lot 108 may be required for processing at the second destination 104. Thus, it may be desirable to have the wafer lot 108 readily available at the second destination 104 at the completion of the current process, such that no processing time is lost. In achieving the goal of having the wafer lot 108 available at the second destination 104 in advance of the completion of the current process, real time information 110 from the semiconductor processing facility 100 may be collected. Although the example of FIG. 1 may depict the real time information 110 as being supplied only from the first destination 102, the second destination 104, and the transport system 106, all pieces of equipment of the semiconductor processing facility 100 (e.g., including equipment at the processing station 118 and other pieces of processing equipment) may generate the real time information 110 that is collected.

The real time information 110 may include information on the current process executing in the semiconductor processing facility, where the information on the current process may include first data that indicates an amount of time required to complete the current process. The first data may include real time data generated from any of the pieces of processing equipment in the facility 100 (e.g., processing equipment at the first destination 102, the second destination 104, and the processing station 118). The first data may be based, for example, on data from an internal clock from a processing chamber or piece of equipment used in the current process. For example, the first data may include or indicate an amount of time elapsed in the current process or a step of the current process, a percentage of the current process or the step of the current process that has been completed, an estimated time remaining in the current process or the step of the current process, and/or a feedback signal indicating a completion of one or more tasks or steps of the current process.

In an example, the wafer lot 108 may be initially located at the first destination 102. A step of the current process may be executed at the second destination 104, where a different wafer lot is being processed. The real time information 110 may thus include data that indicates when the processing of the different wafer lot will be complete at the second destination 104. This real time data may be used for, among other things, ensuring that the wafer lot 108 is available at the second destination 104 immediately after the completion of the processing of the different wafer lot.

The real time information 110 may also include information on a transfer time, where the information on the transfer time may include second data that indicates an amount of time required to transport the wafer lot 108 to various locations within the facility 100 (e.g., an amount of time required to transport the wafer lot 108 from the first destination 102 to the second destination 104).

The real time information 110, which may be in contrast to historical information or information based on previously executed processes, may be collected by a controller 112 of the semiconductor processing facility 100. In one example, the controller 112 is a server configured to store the real time information 110. The controller 112 may comprise various other forms and may comprise hardware or software configured to receive inputs from components of the semiconductor processing facility 100 and to generate outputs used to control one or more of the components. The controller 112 may determine when the critical stage of the current process will occur based on the collected real time information 110. For example, the real time information 110 may indicate required processing times at various pieces of equipment, and based on the required processing times, the controller 112 may be able to determine the critical stage of the current process.

As noted above, the real time information 110 may also include information on the transfer time, where the information on the transfer time may include the second data that indicates the amount of time required to transport the wafer lot 108 to various locations within the facility 100. For example, the real time information 110 may indicate the amount of time required to transport the wafer lot 108 from the first destination 102 to the second destination 104. The time required to transport the wafer lot 108 may include, for example, a time that the wafer lot 108 spends being processed at the processing station 118. The time required to transport the wafer lot 108 may also include the time that the wafer lot 108 spends moving along ceiling tracks of the transport system 106. The determination of the amount of time required to transport the wafer lot 108 from the first destination 102 to the second destination 104 may be made based on the real time information 110 received from the various pieces of equipment of the facility 100 and the real time information 110 from the transport system 106.

The determination of the amount of time required to transport the wafer lot 108 to various locations within the facility 100 may also be made on the basis of properties of semiconductor processing facility 100. For example, a property of the semiconductor processing facility 100 may include the capacity of the transport system 106, where the capacity may indicate an amount of material (e.g., a number of wafers or a number of containers of wafers) that may be transported in a given amount of time by the transport system 106. The properties of the semiconductor processing facility 100 used to determine the amount of time required for the transportation may include other metrics of the facility 100 that may be unchanging with time (e.g., an allowable queue size of a stocker included at the first destination 102, etc.).

The controller 112 may be further configured to issue a request 114 to the transport system 106 to effect the transportation of the wafer lot 108 to various locations within the facility 100. For example, the request may be used to effect the transportation of the wafer lot 108 from the first destination 102 to the second destination 104. A timing of the request 114 may be based on the collected real time information 110. In an example, the request 114 may control when the wafer lot 108 is placed on a processing line of the semiconductor processing facility 100. Thus, the controller 102 may determine when the wafer lot 108 should be placed on the processing line based on the real time information that may include i) information on a current process that indicates an amount of time required to complete the current process, and ii) information on a transfer time that indicates an amount of time required to transport the wafer lot 108 from a starting point to an end point within the facility 100.

In an example, the timing of the request 114 may be based on the real time information 110 and may not be based on historical data. The use of the real time information 110 as opposed to the historical data may be advantageous because various parameters of the semiconductor processing facility 100 may change over time, which may cause historical data to be inaccurate. Transporting the wafer lot 108 based on inaccurate historical data may lead to various problems, including "chamber lost" time (i.e., time when a chamber is usable, but is in an idle state), "tool lost" time (i.e., time when a processing tool is usable, but is in an idle state), "stage lost" time (i.e., time lost during the transportation of the wafer lot 108 from a starting point to an ending point, such as when the transport system is not prepared to perform the transportation), an extended "Qtime period" (i.e., a time required to process the wafer lot 108, where the time may measure an amount of time from when the wafer lot 108 is placed on the processing line until a time at which a finished product is prepared). In one example, the transportation of the wafer lot 108 may begin immediately after the request 114 is issued. The request 114 may be issued to the transport system 106 before the completion of the current process.

Because the timing of the request 114 may be based on the real time information 110, the request 114 may be timed such that the wafer lot 108 is available at a desired destination prior to the completion of the current process. Timing the request 114 in this manner may be used to ensure that no processing time is lost at the desired destination. For example, if a chamber at the second destination 104 is to perform processing on the wafer lot 108 at the completion of the current process, the real time information 110 may be used to time the transportation of the wafer lot 108 such that it arrives at the second destination 104 just prior to the completion of the current process. The timing of the request 114 may also be used to ensure that the wafer lot 108 is not transported to the desired destination at too early a time. For example, although it may be desirable to ensure that the wafer lot 108 is available at the second destination 104 in advance of the completion of the current process, it may also be desirable to prevent an excessive amount of wafers from being moved into in a storage area of the second destination 104 (e.g., where the wafers at the storage area may go unprocessed for a period of time, thus extending a Qtime window for the wafers). Thus, the timing of the request 114 may be used to ensure that the wafer lot 108 is available at second destination 104 just prior to the point in time in which the current process is completed and not earlier.

The issuing of the request 114 prior to the completion of the current process may be in contrast to methods used in conventional manufacturing systems. In such conventional manufacturing systems, a request for additional material may be made only after the additional material is required in a processing chamber. When the request for the additional material is made after the additional material is already required (e.g., at the completion of a step of the process, where the completion of the step triggers a need for the additional material), the conventional system may suffer lost processing time and idle equipment. For example, the lost processing time may include time spent in transporting the additional material to the processing chamber, time spent in cleaning the additional material to prepare the additional material for current processing, and time spent in venting the processing chamber.

The use of the real time information 110 in controlling the transportation of the wafer lot 108 may be used in other advantageous ways. In an example, the semiconductor processing facility 100 may include a plurality of chambers, where each of the chambers may be configured to perform processing to produce a particular product or device. Similarly, a particular lot of semiconductor wafers may be configured to be used in producing a particular product or device. In an example, if multiple wafer lots are placed on the processing line of the semiconductor processing facility 100, and if all of the multiple wafer lots are configured to used in producing a same, particular product or device, then certain processing chambers may be idle while a single one of the processing chambers is active in processing the multiple wafer lots for the particular product or device. The use of the controller 112 and the real time information 110, as described above, may be used in preventing such idle processing chambers. For example, the real time information may be used to predict when a processing chamber will be idle, such that a correct lot can be provided on the processing line to prevent the processing chamber from being idle. This may involve monitoring and managing the real time data from the multiple processing chambers and placing wafer lots on the processing line in an order that minimizes idle time in the chambers.

In another example, the transport system 106 may undergo preparation in order to effect the transportation of the wafer lot 108 based on the real time information 110. For example, the preparing of the transport system 106 may include moving an overhead transport (OHT) unit of the transport system 106 based on the real time information 110. The moving of the OHT unit may cause the OHT unit to be available to transport the wafer lot 108 immediately upon the issuing of the request 114. Preparing the transport system 106 based on the real time information 110 may minimize a "stage lost" time period (i.e., time lost during the transportation of the wafer lot 108 from a starting point to an end point, such as when the transport system 106 is not prepared to perform the transportation).

As described above, the real time information 110 may be used to determine critical stages (e.g., bottleneck steps) of processes executing in the facility 100. In an example, a timing of the request 114 may be based on a determined critical stage. Thus, the wafer lot 108 may be transported in the facility 100 (e.g., loaded onto a processing line of the semiconductor processing facility 100) based on the determined critical stage. In this example, the slowest equipment of the current process (i.e., the equipment associated with the critical stage) may be monitored, and the wafer lot 108 may be transported based on a state of the processing at the slowest equipment. For example, if the slowest equipment is processing a previous wafer lot, then the current wafer lot 108 may not be moved onto a processing line of the semiconductor processing facility 100.

In alternative systems, the moving of the wafer lot 108 onto the processing line may be based on a first piece of equipment on the processing line only (e.g., if the first equipment on the processing line becomes ready to accept new wafers, then the wafer lot 108 may be placed on the processing line). Such alternative systems, lacking an ability to collect real time information on downstream tools, may not monitor downstream equipment on the processing line, such as the slowest equipment, and may suffer from overcrowded processing lines (e.g., there may be too many wafers in storage at the downstream tools, thus causing an extended Qtime for these wafers). Because the tool capacity is fixed, the wafers may not be processed in a timely manner. Further, as described above, the use of the real time information 110 may be used to address the converse problem, where there are too few wafers available for processing at the downstream tool. In situations where there are too few wafers available for processing at the downstream tool, the downstream tool will suffer chamber lost time or tool lost time because not enough wafers are available at the downstream tool.

In another example, critical stages determined based on the real time information 110 may be used in determining an ordering of wafer lots to be placed on the processing line of the semiconductor processing facility 100. For example, the transport system 106 may be configured to transport a first wafer lot and a second wafer lot within the semiconductor processing facility 100. The first wafer lot and the second wafer lot may be processed in different ways, such that the first wafer lot has a first critical stage (e.g., a step that limits a throughput of the processing of the first wafer lot more than all other steps required in the processing of the first wafer lot) and the second wafer lot has a second critical stage (e.g., a step that limits a throughput of the processing of the second wafer lot more than all other steps required in the processing of the second wafer lot). A temporal ordering may be determined based on the first critical stage and the second critical stage, where the temporal ordering may require either the first wafer lot or the second wafer lot to be placed on the processing line prior to the other wafer lot. For example, if a wafer lot A (i.e., used to make a product A) and a wafer lot B (i.e., used to make a product B) are both placed on the processing line at the same time, and if a critical stage of the wafer lot B causes the processing of the wafer lot B to be slower than the processing of the wafer lot A, then a subsequent wafer lot A may be placed on the processing line prior to a subsequent wafer lot B. In this manner, a correct lot may be placed on the processing line based on the real time information that is used to determine the critical stages.

Figure 2:
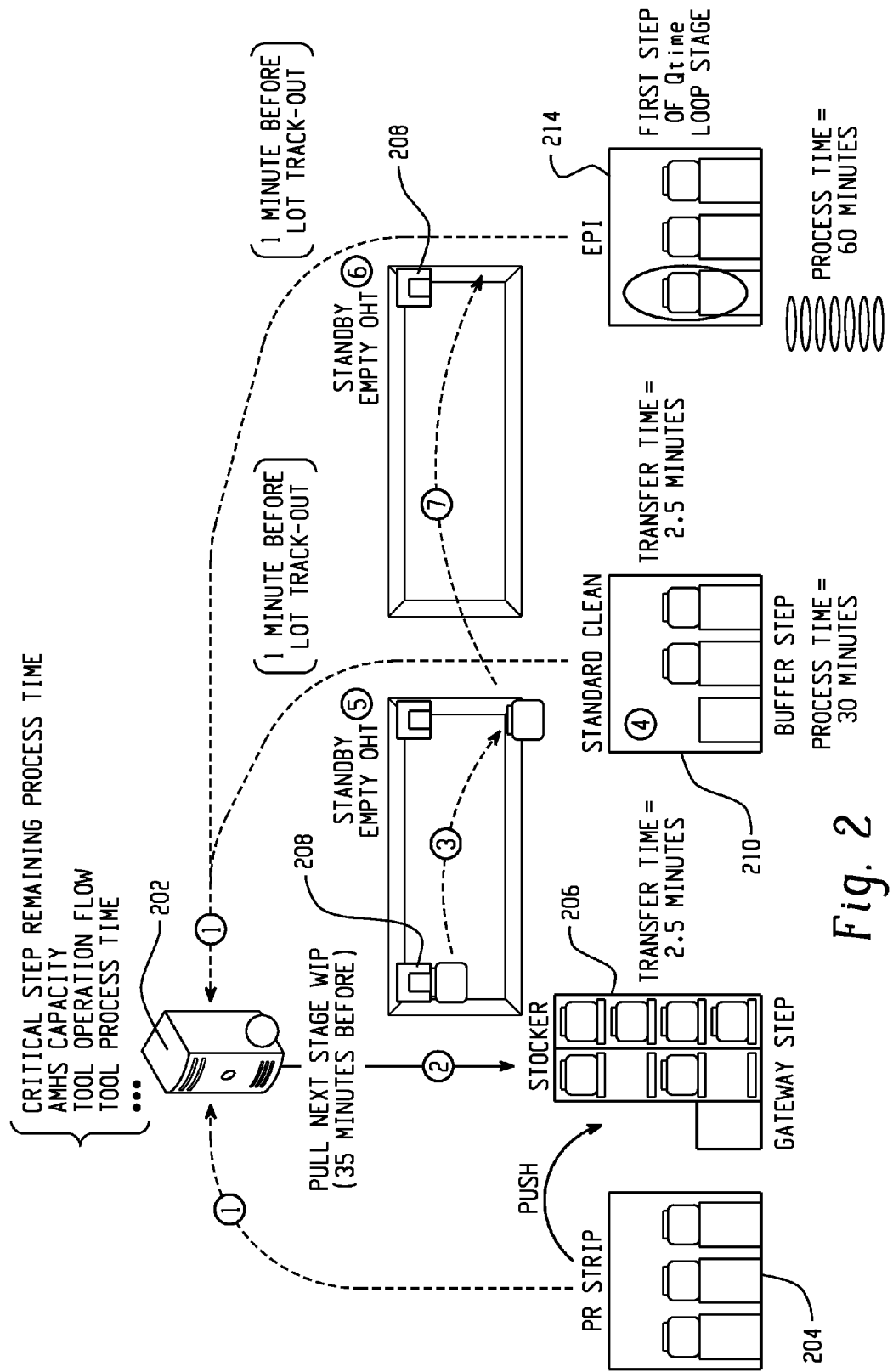
FIG. 2 illustrates aspects of a stage pull mode process configured to minimize idle equipment time in a semiconductor processing facility.

FIG. 2 illustrates aspects of a stage pull mode process configured to minimize idle equipment time in a semiconductor processing facility. In FIG. 2, the semiconductor processing facility may include a server 202, a photoresist strip ("PR strip") station 204, a stocker 206, a buffer station 210, and processing equipment 214. In order to transport wafer lots to the various locations of the semiconductor processing facility, the facility further includes a transport system including transport units 208. The transport system may use ceiling tracks and OHT transport vehicles 208 that move along the ceiling tracks to deliver wafer lots to the various locations of the facility. The transportation of the material between the stocker 206, the buffer station 216, and the processing equipment 214 may consume an amount of time. As described in further detail below, the amount of time may be considered in determining when to issue a request to begin transportation of a material from the stocker 206 to the processing equipment 214.

Photoresist may be removed from wafers at the photoresist removal station 204, and following the photoresist removal, the wafers may be moved to the stocker 206 via a "push" operation. The photoresist removal station 204 and other equipment 206, 210, 214 described herein are merely examples, and the methodology described herein with reference to FIG. 2 may support various different pieces of equipment. The stocker 206 may function as a storage location for various materials used in the example semiconductor processing facility and may include containers or cassettes of the materials. The buffer station 210 may be used to perform various processing on the wafers to prepare the wafers to be used at the processing equipment 214. Thus, the processing performed at the buffer station 210 may include a standard cleaning or another intermediate process that is performed after removing wafers from the stocker 206 but before the wafers are accepted at the processing equipment 214. The processing equipment 214 may be used in performing various semiconductor processing steps (e.g., an epitaxial growth process, a deposition process, an etch process, etc.).

In alternative systems, upstream tools (e.g., the PR strip 204 and stocker 206) may be unable to know the processing status of downstream tools (e.g., the buffer station 210 and the processing equipment 214). In these alternative systems, the upstream tools may always push wafer lots into storage areas of the downstream tools when a lot operation involving the wafer lots is completed. For example, in an alternative system, wafers may be moved from the stocker 206 to the buffer station 210 when the buffer station 210 has become idle. The movement of the wafers in the alternative system may not give consideration to a state of the processing equipment 214 (i.e., the downstream tool), and this may cause an overabundance of wafers to be placed in storage units, as the wafers wait for the processing equipment 214 to become available. In situations where there is a Qtime concern stage, if there are too may WIP (works-in-progress) in storage at the downstream tool, there may be an "over Qtime" issue. In the "over Qtime" issue, because the tool capacity may be fixed, the WIP may not be processed on time. By contrast, if there are too few WIP in storage at the downstream tool, the tool may have chamber lost (e.g., the chamber is workable, but the state is idle) or tool lost (e.g., the tool is workable, but the state is idle) because the required process lot is not sufficient. Further, in the alternative systems, a required wafer lot may not be requested until after a piece of processing equipment has become idle, thus causing the processing equipment to be in an undesirable idle state while awaiting the required wafer lot to be delivered.

In the example system of FIG. 2, the disadvantages of the above-described alternative systems may be minimized. In a first step (i.e., as illustrated by the circled "1" values in FIG. 2), real time information from the PR strip station 204, the buffer station 210, and the processing equipment 214 may be collected at the server 202. The real time information may include information on current processes that are being executed at the stations 204, 210, 214, and the information on the current processes may include first data that indicates an amount of time required to complete each of the current processes. For example, the PR strip station 204 may generate a first amount of time that indicates an amount of time required to complete a process in the PR strip station 204, and the buffer station 210 and the processing equipment 214 may do so likewise.

As illustrated in FIG. 2, the real time information collected at the server 202 may include "critical step remaining process time," "AMHS capacity," "tool process time," and "tool operation flow." The "critical step remaining process time" data may indicate an amount of time remaining in a critical step of a process used to process a wafer lot. The critical step may be a particular step of the process, where the particular step may limit a throughput of the process more than all other steps of the process. The "AMHS capacity" data may refer to a capacity of an automated material handling system (AMHS) of the facility that moves containers or cassettes of semiconductor materials to various destinations of the semiconductor processing facility. The "tool process time" data may indicate an amount of time associated with a particular piece of processing equipment (e.g., an amount of processing time that has elapsed at the particular piece of processing equipment, a percentage of a process that has been completed at the particular piece of processing equipment, an estimated time remaining for the processing at the particular piece of processing equipment, or a feedback signal indicating a completion of one or more tasks of the process at the particular piece of equipment). The "tool operation flow" data may indicate a total time required to process a wafer lot, where the total time may measure an amount of time from when the wafer lot is placed on the processing line until a time at which a finished product is prepared.

The server 202 may also collect real time information on various transfer times of the facility. The information on the transfer times may include second data that indicates an amount of time required to transport wafers from various starting points to end points of the facility. The real time information on the transfer times may be received from the transport system and/or the processing stations 204, 206, 210, 214, for example. As illustrated in FIG. 2, there may be a transfer time of 2.5 minutes in transferring a wafer lot between the stocker 206 and the buffer station 210. Similarly, there may be a transfer time of 2.5 minutes in transferring a wafer lot between the buffer station 210 and the processing equipment 214. Additionally, the information on the transfer times may include time required in processing the wafer lot at the various stations. For example, in transferring a wafer lot from the stocker 206 to the processing equipment 214, the transfer time may include processing time at the buffer station 210 (e.g., the processing time of 30 minutes, as indicated in FIG. 2) as well as the aforementioned 2.5 minute transfer times between the stations 206, 210, 214.

In a second step (i.e., as illustrated by the circled "2" value in FIG. 2), the server 202 may issue a request to the stocker 206 and/or the transport system to effect the transportation of a wafer lot from the stocker 206 to the processing equipment 214. The wafer lot may be referred to as a "WIP" (i.e., a work in progress), such that the request may be to pull the next stage WIP, as indicated in FIG. 2. A timing of the request may be based on the real time information collected at the server 202 (e.g., the critical step remaining process time, the AMHS capacity, the tool operation flow, the tool process time, and/or the real time data on the transfer times). Additionally, as illustrated in FIG. 2, the request may be issued prior to a point in time in which the wafer lot is needed at the processing station 214. Using the real time information, it may be determined that it will take 35 minutes to transport the wafer lot from the stocker 206 to the processing equipment 214. Thus, the request to pull the wafer lot may be issued 35 minutes prior to the point in time in which the wafer lot is needed. Issuing the request 35 minutes early may help to minimize idle time at the processing equipment 214.

Additionally, a required wafer lot may be specified in the request from the server 202. The processing equipment 214 may be characterized as being a "chamber type process tool" (i.e., the processing station 214 may only be configured to process wafers for a particular product or device, as described above). Thus, the processing equipment 214 may require a certain type of wafer lot that is stored in the stocker 202 (e.g., the processing equipment 214 may not be configured to process other types of wafer lots). The real time information collected at the server 202 may be used to help ensure that a correct wafer lot is placed on the processing line. Placing the correct wafer lot on the processing line may help to minimize idle time at the processing equipment 214.

In an example, where there are multiple "chamber type process tools" (e.g., multiple processing stations that are configured to process only certain types of wafer lots) included in the semiconductor processing facility, the real time information at the server may be used to determine an ordering in which wafer lots are placed on the processing line. For example, the real time information may indicate that a first chamber will require wafers before a second chamber, and thus, the wafers for the first chamber may be placed on the processing line before wafers for the second chamber. By managing the ordering of the wafer lots based on the real time information, lots may be placed on the processing line in a manner that minimizes the overall idle time of the various pieces of equipment.

The server 202 may be configured to cause the transport system to become prepared to move the wafer lot from the stocker 206 to the processing equipment 214. The preparing of the transport system may include moving the OHT vehicles 208 based on the collected real time information. The moving of the OHT vehicles 208 may cause the OHT vehicles to be available to transport the wafer lot precisely when the OHT vehicles 208 are needed. For example, based on the real time information, the server 202 may be configured to begin moving a first OHT vehicle (i.e., as illustrated by the circled "5" value in FIG. 2) towards the stocker 206 approximately 1 minute prior to a time at which the first OHT vehicle is needed at the stocker 206. Similarly, the server 202 may be configured to begin moving a second OHT vehicle (i.e., as illustrated by the circled "6" value in FIG. 2) towards the buffer station 210 approximately 1 minute prior to a time at which the second OHT vehicle is needed at the buffer station 210. The preparing of the OHT vehicles 208 in this manner may help to minimize a "stage lost" time (i.e., time lost during the transportation of the wafer lot from a first destination to a second destination, such as when the transport system is not prepared to perform the transportation).

In a third step (i.e., as illustrated by the circled "3" value in FIG. 2), the first OHT vehicle may transport the wafer lot from the stocker 206 to the buffer station 210. Subsequently, the wafer lot may be processed at the buffer station 210 (e.g., a standard clean may be performed that lasts 30 minutes). The wafer lot may then be transported via the second OHT vehicle from the buffer station 210 to the processing equipment 214. At the processing equipment 214, processing of the wafer lot may require 60 minutes of time, as indicated in FIG. 2.

Figure 3:
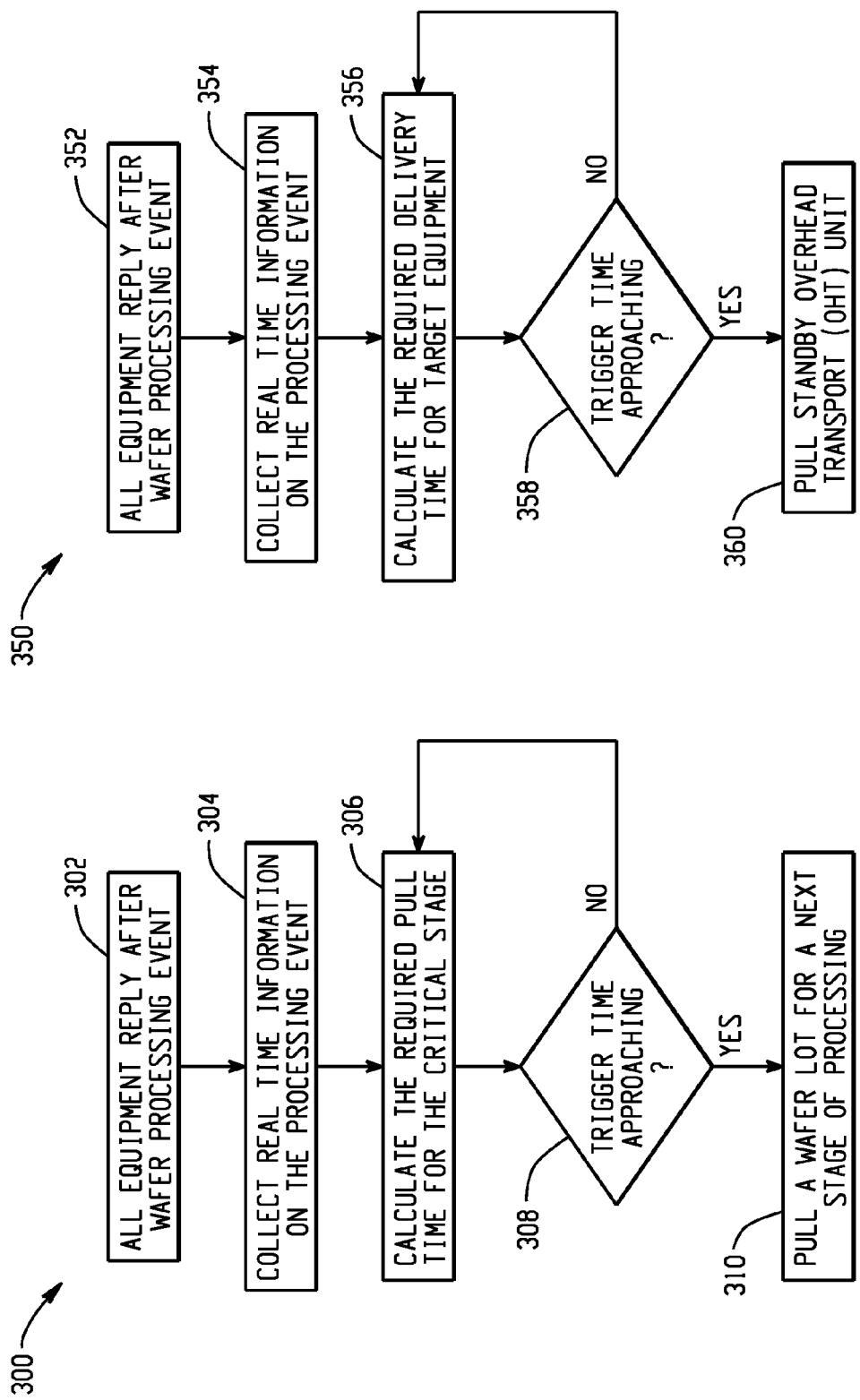
FIG. 3A depicts an example flowchart illustrating an example method for issuing a request to effect a transportation of a wafer lot from a first destination to a second destination of a semiconductor processing facility.
FIG. 3B depicts an example flowchart illustrating an example method for preparing a transport system to move a wafer lot in a semiconductor processing facility.

FIG. 3A depicts an example flowchart 300 illustrating an example method for issuing a request to effect a transportation of a wafer lot from a first destination to a second destination of a semiconductor processing facility. At 302, an equipment reply may be generated by a piece of equipment based on a processing event. The reply may be generated based on a start of a processing event, a completion of a processing event, or on completion of a sub-step (e.g., a particular task) of the processing event. The semiconductor processing facility may include multiple pieces of equipment, and as illustrated in FIG. 3A, all pieces of equipment in the facility may generate such equipment replies based on processing events. At 304, a controller or server may collect real time information on the processing events based on the equipment replies. The real time information may include information that indicates amounts of time required to complete various processes in the pieces of equipment and information that indicates amounts of time required to transport the wafer lot between various locations of the processing facility.

A critical stage associated with the wafer lot may be determined based on the collected real time information. In an example, the critical stage may be assigned dynamically, such that the critical stage may change one or more times based on the newly-received real time information. At 306, a time at which the wafer lot should be pulled (e.g., a timing of a request to transport the wafer lot) may be determined based on the real time information and the critical stage. At 308, a determination may be made as to whether the time to pull the wafer lot (e.g., the trigger time) is approaching. If the trigger time is not approaching, the flowchart 300 may return to the step 306, where the critical stage and the time at which the wafer lot should be pulled may be recalculated based on the real time information. If it is determined that the trigger time is approaching, at 310, the wafer lot may be pulled for a next stage of processing. The pulling of the wafer lot may begin the transportation of the wafer via a transport system of the semiconductor processing facility.

FIG. 3B depicts an example flowchart 350 illustrating an example method for preparing a transport system to move a wafer lot in a semiconductor processing facility. At 352, all pieces of equipment included in the semiconductor processing facility may generate equipment replies based on processing events that have occurred. At 354, a controller or server may collect real time information on the processing events based on the equipment replies. At 356, a required delivery time for a piece of target equipment may be determined. For example, if the wafer lot is to be transported from a first destination to a second destination, a piece of processing equipment at the second destination may comprise the target equipment. The required delivery time may be determined based on the real time information, and in particular, the required delivery time may be based on a critical stage (e.g., a slowest stage or a slowest piece of equipment) of a process occurring prior to the transporting of the wafer lot.

At 358, a determination may be made as to whether the time to pull the wafer lot (e.g., the trigger time) is approaching. If the trigger time is not approaching, the flowchart 300 may return to the step 356, where the required delivery time may be recalculated based on the real time information. In this manner, the required delivery time may be assigned dynamically and may change one or more times based on newly-received real time information. If it is determined that the trigger time is approaching, at 360, a standby overhead transport (OHT) unit may be pulled and moved toward a place at which the wafer lot is located. In this manner, the OHT unit may be available to transport the wafer lot immediately, thus minimizing a stage lost time.

Figure 4:
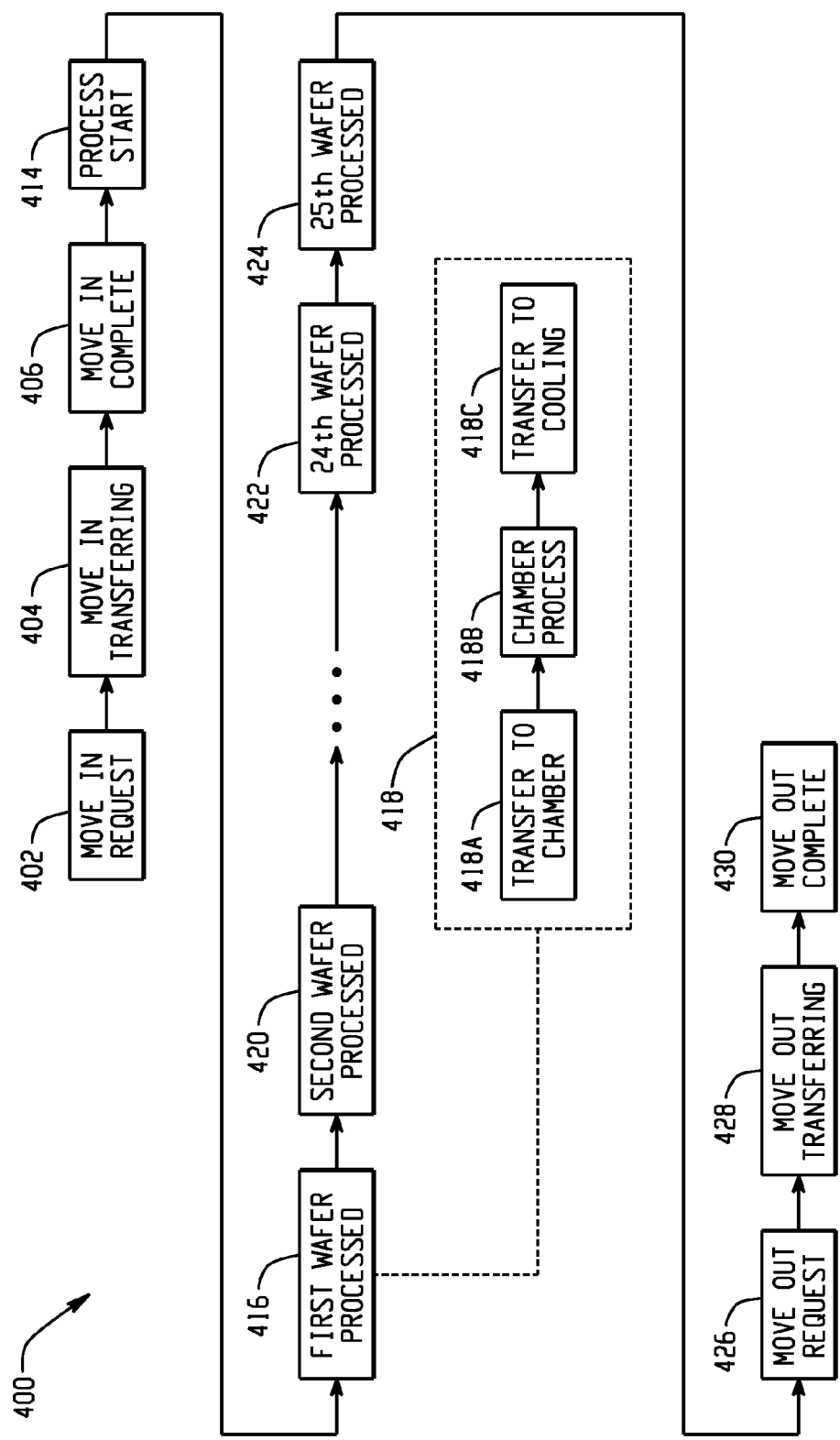
FIG. 4 depicts an example flowchart depicting a method for semiconductor processing, where a timing of a request to transport a wafer lot is configured to coincide with a process event.

FIG. 4 depicts an example flowchart 400 depicting a method for semiconductor processing, where a timing of a request to transport a wafer lot is configured to coincide with a process event. In FIG. 4, the steps of the example flowchart 400 may comprise steps that occur at a processing chamber. The processing chamber may be located at, for example, the second destination 104 of FIG. 1 or the processing equipment 214 of FIG. 2. The processing chamber at which the steps occur may be included in a semiconductor processing facility, and the semiconductor processing facility may further include a material supply station (e.g., a stocker) configured to supply the wafer lot to the processing chamber. A transport system may be configured to transport the wafer lot from the material supply station to the processing chamber based on a request from a controller (e.g., a server).

In FIG. 4, the steps of the example flowchart may cause real time information to be collected at the controller. For example, with the completion of each step of the flowchart 400, a feedback signal may be generated at a component of the processing facility and transmitted to the controller. As described above, the controller may use the real time information to determine when to issue the request to begin transportation of the wafer lot. At 402, a move in request may be used to initiate a movement of a first container of materials. The first container of materials may contain, as in the example of FIG. 4, twenty-five wafers. In an example, the first container of materials may not be moved directly into the processing chamber, but may rather be moved to a location near the processing chamber (e.g., a load-in area or port of the processing chamber). By moving the first container of materials to the location near the processing chamber, wafers of the first container of materials may become available for processing in the processing chamber. At 404, the movement of the first container of materials may continue with the transferring of the first container of materials from a storage location to the location near the processing chamber. At 406, the movement of the first container of materials to the location near the processing chamber may be complete.

At 414, a current process may begin in the processing chamber. At 416, as part of the current process, a first wafer of the first container of wafers may be processed. Steps used in processing the first wafer may be illustrated at 418 in the flowchart 400. At 418A, the first wafer may be transferred into the processing chamber. At 418B, the first wafer may be processed in the processing chamber. At 418C, following the processing, the first wafer may be transferred to a cooling station. At 420, a second wafer of the first container of wafers may be processed, where the second wafer may be processed according to the steps 418A, 418B, and 418C. Other wafers of the first container of materials may be processed in a manner similar, according to the steps 418A, 418B, 418C (e.g., a third wafer of the first container of wafers, a fourth wafer of the first container of wafers, and so on). At 422, a twenty-fourth wafer of the first container of wafers may be processed according to the steps 418A, 418B, and 418C. At 424, a twenty-fifth wafer of the first container of wafers may be processed according to the steps 418A, 418B, and 418C.

At 426, a move out request may be used to initiate a movement of the first container of materials away from the processing chamber. At 428, the movement of the first container of materials away from the processing chamber may continue with the transferring of the first container of materials to a location away from the processing chamber. At 430, the movement of the first container of materials to the location away from the processing chamber may be complete.

In the example of FIG. 4, the timing of the request to transport the next wafer lot into the processing chamber may be configured to coincide with the process event 422. Specifically, the processing of the twenty-fourth wafer of the first container, as may be performed in the process event 422, may be determined to be an acceptable trigger point for requesting the transportation of the next wafer lot from the material supply station to the processing chamber. In the example of FIG. 4, the request to transport the next wafer lot that coincides with the process event 422 may cause the transportation of the next wafer lot to begin 30 minutes prior to a completion of the process in the processing chamber. The trigger point may be determined based on the collected real time information. In other examples, the trigger point may not be configured to coincide with a processing event and may instead be based on other aspects of the collected real time information. Additionally, in the example of FIG. 4, the request to pull the next wafer lot may specify exactly which wafer lot is needed at the processing chamber.

Figure 5:
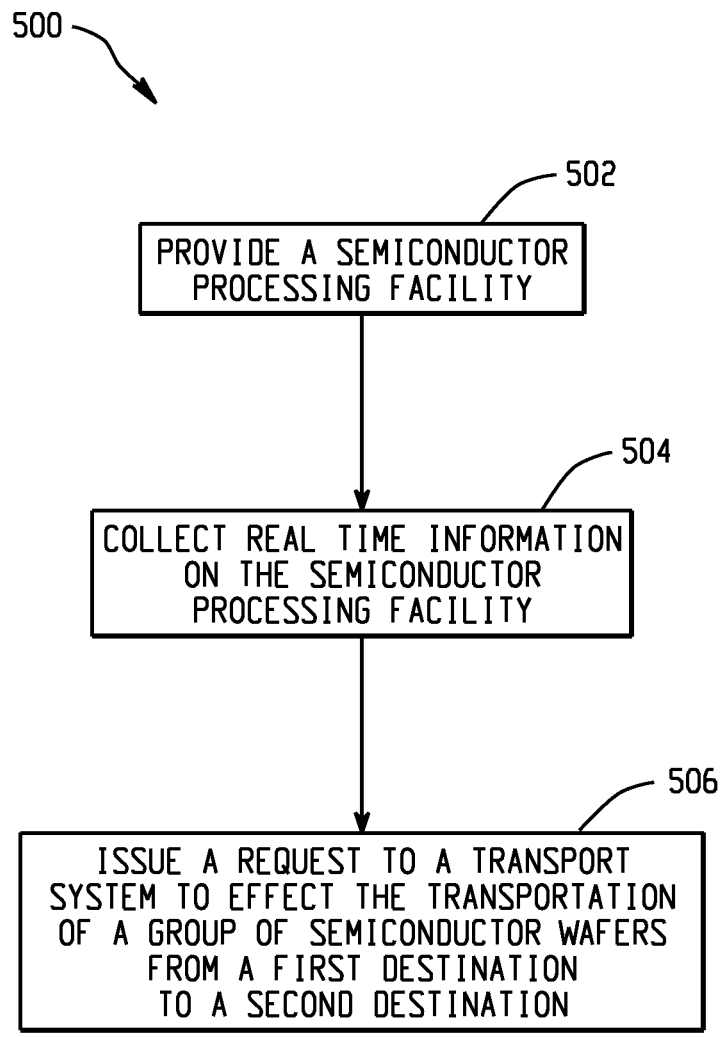
FIG. 5 is a flowchart illustrating an example method for transporting a group of semiconductor wafers in a semiconductor processing facility.

FIG. 5 is a flowchart 500 illustrating an example method for transporting a group of semiconductor wafers in a semiconductor processing facility. At 502, a semiconductor processing facility is provided. The semiconductor processing facility includes i) a first destination and a second destination, and ii) a transport system configured to transport the group of semiconductor wafers from the first destination to the second destination. At 504, real time information is collected, where the real time information includes information on a current process executing in the semiconductor processing facility. The information on the current process includes first data that indicates an amount of time required to complete the current process. The real time information also includes information on a transfer time. The information on the transfer time includes second data that indicates an amount of time required to transport the group of semiconductor wafers from the first destination to the second destination. At 506, a request is issued to the transport system to effect the transportation of the group of semiconductor wafers from the first destination to the second destination, where a timing of the request is based on the collected real time information.

The present disclosure is directed to a method for transporting a group of semiconductor wafers in a semiconductor processing facility and a manufacturing system. In an embodiment of a method for transporting a group of semiconductor wafers in a semiconductor processing facility, a semiconductor processing facility is provided. The semiconductor processing facility includes i) a first destination and a second destination, and ii) a transport system configured to transport the group of semiconductor wafers from the first destination to the second destination. Real time information is collected, where the real time information includes information on a current process executing in the semiconductor processing facility. The information on the current process includes first data that indicates an amount of time required to complete the current process. The real time information also includes information on a transfer time. The information on the transfer time includes second data that indicates an amount of time required to transport the group of semiconductor wafers from the first destination to the second destination. A request is issued to the transport system to effect the transportation of the group of semiconductor wafers from the first destination to the second destination, where a timing of the request is based on the first data and the second data.

In another embodiment of a method for transporting a group of semiconductor wafers in a semiconductor processing facility, a semiconductor processing facility is provided with i) a stocker and a processing equipment, and ii) a transport system configured to transport the group of semiconductor wafers from the stocker to the processing equipment. Real time information is collected, where the real time information includes information on a current process executing in the semiconductor processing facility. The information on the current process includes first data that indicates an amount of time required to complete the current process, where the current process includes a plurality of steps. The real time information also includes information on a transfer time. The information on the transfer time includes second data that indicates an amount of time required to transport the group of semiconductor wafers from the stocker to the processing equipment. Based on the real time information, a critical stage for the current process is determined, where the critical stage is a particular step of the plurality of steps. The particular step limits a throughput of the current process more than all other steps of the plurality of steps. A request is issued to the transport system to effect the transportation of the group of semiconductor wafers from the stocker to the processing equipment, where a timing of the request is based on the real time information and the critical stage.

In an embodiment of a manufacturing system, the manufacturing system includes a semiconductor processing facility. The semiconductor processing facility includes a first destination and a second destination. The semiconductor processing facility also includes a transport system configured to transport a group of semiconductor wafers from the first destination to the second destination. The manufacturing system also includes a controller, where the controller is configured to collect real time information. The real time information includes information on a current process executing in the semiconductor processing facility. The information on the current process includes first data that indicates an amount of time required to complete the current process. The real time information also includes information on a transfer time. The information on the transfer time includes second data that indicates an amount of time required to transport the group of semiconductor wafers from the first destination to the second destination. The controller is also configured to issue a request to the transport system to effect the transportation of the group of semiconductor wafers from the first destination to the second destination. A timing of the request is based on the first data and the second data.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for transporting a group of semiconductor wafers in a semiconductor processing facility, the method comprising:
   providing a semiconductor processing facility with i) a first destination and a second destination, and ii) a transport system that transports the group of semiconductor wafers from the first destination to the second destination;
   collecting real time information, wherein the real time information includes:
      information on a current process executing in the semiconductor processing facility, the information on the current process including first data that indicates an amount of time required to complete the current process, and
      information on a transfer time, the information on the transfer time including second data that indicates an amount of time required to transport the group of semiconductor wafers from the first destination to the second destination;
   determining a time for issuing a request to the transport system using the first data and the second data; and
   issuing the request to the transport system at the determined time to effect the transportation of the group of semiconductor wafers from the first destination to the second destination, wherein the transport system transports i) the group of semiconductor wafers, and ii) a second group of semiconductor wafers from the first destination to the second destination, the method further comprising: determining a first critical step in the processing of the group of semiconductor wafers that limits a throughput more than all other steps in the processing of the group; determining a second critical step in the processing of the second group of semiconductor wafers that limits a throughput more than all other steps in the processing of the second group; and determining a temporal ordering using the first and second critical steps, wherein the temporal ordering dictates whether the group of semiconductor wafers is placed on the transport system before the second group is placed on the transport system.

2. The method of claim 1, further comprising:
   preparing the transport system to effect the transportation of the group of semiconductor wafers, wherein the preparing of the transport system includes moving an overhead transport (OHT) unit of the transport system using the real time information, and wherein the moving of the OHT unit causes the OHT unit to be available to transport the group of semiconductor wafers immediately upon the issuing of the request.

3. The method of claim 1, wherein the issuing of the request at the determined time causes the group of semiconductor wafers to be available at the second destination upon completion of the current process, such that a chamber or processing equipment at the second destination does not enter an idle state.

4. The method of claim 1, wherein the current process includes a plurality of steps, the method further comprising:
   determining, using the real time information, a critical stage for the current process, the critical stage being a particular step of the plurality of steps, wherein the particular step limits a throughput of the current process more than all other steps of the plurality of steps.

5. The method of claim 4, further comprising:
   determining the critical stage of the current process via a dynamic process, wherein the dynamic process changes the critical stage one or more times using the real time information.

6. The method of claim 4, wherein the time is determined using the critical stage.

7. The method of claim 1, wherein the transport transports i) the group of semiconductor wafers, and ii) a second group of semiconductor wafers from the first destination to the second destination, the method further comprising:
   determining, using the real time information, a critical stage for the group of semiconductor wafers, the critical stage being a step required in processing the group of semiconductor wafers, wherein the step limits a throughput of the processing of the group of semiconductor wafers more than all other steps required in the processing of the group of semiconductor wafers;
   determining, using the real time information, a second critical stage for the second group of semiconductor wafers, the second critical stage being a particular step required in processing the second group of semiconductor wafers, wherein the particular step limits a throughput of the processing of the second group of semiconductor wafers more than all other steps required in the processing of the second group of semiconductor wafers; and
   determining a temporal ordering using the critical stage and the second critical stage, wherein the temporal ordering causes the group of semiconductor wafers to be placed on the transport system prior to placing the second group of semiconductor wafers on the transport system.

8. The method of claim 1, wherein the transport system transports i) the group of semiconductor wafers, and ii) a second group of semiconductor wafers from the first destination to the second destination, the method further comprising:
determining a temporal ordering using the real time information, wherein the temporal ordering causes the group of semiconductor wafers to be placed on the transport system prior to placing the second group of semiconductor wafers on the transport system;
wherein the temporal ordering minimizes an amount of idle time of a chamber or processing equipment at the second destination.

9. The method of claim 1, wherein the time is not determined using historical data.

10. The method of claim 1, wherein the first destination includes a stocker that stores the group of semiconductor wafers prior to the transportation, wherein the second destination includes a piece of processing equipment or a processing chamber for processing the group of semiconductor wafers, and wherein the transport system includes an overhead transport (OHT) unit.

11. The method of claim 1, wherein the transportation of the group of semiconductor wafers from the first destination to the second destination via the transport system comprises placing a lot of semiconductor wafers on a processing line of the semiconductor processing facility.

12. The method of claim 1, further comprising:
issuing the request to the transport system prior to a time at which the group of semiconductor wafers is required at the second destination, wherein the transportation of the group of semiconductor wafers from the first destination to the second destination begins immediately after the request is issued, and wherein issuing the request at the determined time causes the group of semiconductor wafers to be available at the second destination prior to the time at which the group of semiconductor wafers is required at the second destination.

13. The method of claim 1, further comprising:
determining the amount of time required to transport the group of semiconductor wafers using the real time information, wherein the transporting includes processing the group of semiconductor wafers to prepare the group of semiconductor wafers to be used at the second destination.

14. The method of claim 1, further comprising:
determining the amount of time required to transport the group of semiconductor wafers, wherein the transporting includes moving the group of semiconductor wafers via an overhead transport (OHT) unit.

15. The method of claim 1, wherein the real time information includes:
an amount of time elapsed in the current process;
a percentage of the current process that has been completed;
an estimated time remaining in the process; or
a feedback signal indicating a completion of one or more tasks in the current process.

16. The method of claim 1, wherein determining the amount of time required to transport the group of semiconductor wafers from the first destination to the second destination includes determining a capacity of the transport system.

17. The method of claim 1,
wherein the time coincides with a process event occurring in the semiconductor processing facility.

18. The method of claim 1, further comprising:
determining the amount of time via a dynamic process, wherein the dynamic process changes the amount of time one or more times using the real time information.

19. A method for transporting a group of semiconductor wafers in a semiconductor processing facility, the method comprising:
providing a semiconductor processing facility with i) a stocker and a processing equipment, and ii) a transport system that transports the group of semiconductor wafers from the stocker to the processing equipment;
collecting real time information, wherein the real time information includes:
information on a current process executing in the semiconductor processing facility, the information on the current process including first data that indicates an amount of time required to complete the current process, wherein the current process includes a plurality of steps, and
information on a transfer time, the information on the transfer time including second data that indicates an amount of time required to transport the group of semiconductor wafers from the stocker to the processing equipment;
determining, using the real time information, a critical stage for the current process, the critical stage being a particular step of the plurality of steps, wherein the particular step limits a throughput of the current process more than all other steps of the plurality of steps;
determining a time for issuing a request to the transport system using the real time information and the critical stage; and
issuing the request to the transport system at the determined time to effect the transportation of the group of semiconductor wafers from the stocker to the processing equipment, wherein the transport system transports i) the group of semiconductor wafers, and ii) a second group of semiconductor wafers from the first destination to the second destination, the method further comprising; determining a first critical step in the processing of the group of semiconductor wafers that limits a throughput more than all other steps in the processing of the group; determining a second critical step in the processing of the second group of semiconductor wafers that limits a throughput more than all other steps in the processing of the second group; and determining a temporal ordering using the first and second critical steps, wherein the temporal ordering dictates whether the group of semiconductor wafers is placed on the transport system before the second group is placed on the transport system.

20. A manufacturing system for a semiconductor processing facility, the manufacturing system comprising:
a semiconductor processing facility that includes:
a first destination and a second destination, and
a transport system that transports a group of semiconductor wafers from the first destination to the second destination; and
a controller, wherein the controller
collects real time information, wherein the real time information includes:

information on a current process executing in the semiconductor processing facility, the information on the current process including first data that indicates an amount of time required to complete the current process, and information on a transfer time, the information on the transfer time including second data that indicates an amount of time required to transport the group of semiconductor wafers from the first destination to the second destination;

determines a time for issuing a request to the transport system using the first data and the second data; and issues the request to the transport system at the determined time to effect the transportation of the group of semiconductor wafers from the first destination to the second destination, wherein the transport system transports i) the group of semiconductor wafers, and ii) a second group of semiconductor wafers from the first destination to the second destination, determining a first critical step in the processing of the group of semiconductor wafers that limits a throughput more than all other steps in the processing of the group; determining a second critical step in the processing of the second group of semiconductor wafers that limits a throughput more than all other steps in the processing of the second group; and determining a temporal ordering using the first and second critical steps, wherein the temporal ordering dictates whether the group of semiconductor wafers is placed on the transport system before the second group is placed on the transport system.

21. The method of claim 1, wherein the transport system transports i) the group of semiconductor wafers, and ii) a second group of semiconductor wafers from the first destination to the second destination, the method further comprising:

determining a temporal ordering that dictates whether the group of semiconductor wafers is placed on the transport system before the second group is placed on the transport system, wherein the temporal ordering minimizes an amount of idle time of a chamber or processing equipment at the second destination.

* * * * *